United States Patent [19]
Satzinger

[11] 3,988,028
[45] Oct. 26, 1976

[54] SAFETY SYSTEM FOR THE OCCUPANTS OF VEHICLES ESPECIALLY MOTOR VEHICLES

[76] Inventor: Roland Satzinger, Hammelburger Str. 21a, D-8731 Euerdorf, Germany

[22] Filed: Apr. 14, 1975

[21] Appl. No.: 567,895

[30] Foreign Application Priority Data
Apr. 22, 1974 Germany............................ 2419368

[52] U.S. Cl............................. 280/748; 280/746; 297/216; 297/388; 297/390
[51] Int. Cl.².......................................... B60R 21/10
[58] Field of Search .......... 280/150 B, 748, 150 SB, 280/746; 297/216, 390, 388

[56] References Cited
UNITED STATES PATENTS
2,859,048  11/1958  Munn............................ 280/150 SB
3,468,556  9/1969  Smith............................ 280/150 B FOREIGN PATENTS OR APPLICATIONS
2,054,917  3/1972  Germany Primary Examiner—Robert R. Song
Attorney, Agent, or Firm—Burgess, Dinklage & Sprung

[57] ABSTRACT

An improvement in a safety system for occupants of a vehicle having a front seat which front seat has a back rest which improvement lies in a provision for an energy-absorbing holding means for the back rest which energy absorbing holding means comprises a first belt or cable attached at one end to a rearward portion of the body of said vehicle and that the other is wound about and attached to a winder disposed on the rear side of the back rest of the front seat and a second belt or cable attached to said vehicle body rearwardly of the winder and wound about and connected to a winder.

16 Claims, 3 Drawing Figures

SAFETY SYSTEM FOR THE OCCUPANTS OF VEHICLES ESPECIALLY MOTOR VEHICLES

BACKGROUND OF THE INVENTION

1. Field of the Invention

This invention relates to a device for restraining movement of the back rest of a front seat should a vehicle collide. More particularly this invention is directed to a means for insuring that the back rest of a front seat does not twist or become canted upon a short stop or upon impact of a vehicle. This invention is particularly directed to a safety system for motor vehicles equipped with front seats having energy-absorbing means. In accordance with the invention there is provided energy absorbing stays for the seat backs in the form of rearwardly extending belts or cables.

2. Discussion of the Prior Art

Safety systems have been known wherein a belt is passed around the two backs of the front seats. The belt restrains the latter against forward movement in the event of a collision. Such a system is shown in German Offenlegungsschrift 2 054 917. In this known construction, the ends of the belt are fastened through belt winders in the rear portion of the vehicle to the lateral surfaces of the car body. This construction has the disadvantage that, in the event of a collision, no precise energy absorption takes place and the seat backs are canted or twisted especially if the vehicle is unequally occupied.

It therefore became desirable to provide an improved safety system equipped with these belts where there was an energy-absorbing stay which prevented the seat backs from becoming canted or twisted upon collision. More particularly it became desirable to provide such a construction which would preclude the canting or twisting of the back seats even when the vehicle was occupied.

SUMMARY OF THE INVENTION

In accordance with this invention there is provided an improved safety system for the occupants of a vehicle, especially a motor vehicle, having a front seat, said front seat having a back rest, which improvement comprises an energy-absorbing holding means for holding the back rest which energy-absorbing holding means comprises a first belt or cable attached at one end to a rearward portion of the body of the vehicle and the other being wound about and attached to a winder disposed on the rear side of the back rest of the front seat and a second belt or cable attached to the vehicle body rearwardly of said winder and wound about and connected to a winder.

The improvement of the present invention provides a safety system which assures a precise absorption of energy and avoids dangers of the racking and jamming of the movable seat parts, especially in the event of unequal stress, particularly when the vehicle is unevenly occupied. This is intended for the purpose of reducing the danger of injury to front and rear seat occupants.

The improved safety system of the present invention is particularly useful in a safety system wherein the front seats are equipped with energy absorbing damping means such as those which run longitudinally of the vehicle body and are disposed proximate the floor.

By use of belts or cables which engage each side of the front seat of the back rest, one end of each belt or cable being held by means of a winder provided on the back of the front seat back rest and the other end being fastened to the vehicle body and the rear area thereof, it is insured that upon collision or immediate short stopping of the vehicle that all inertia movements forward will be restrained in like manner. Preferably, in accordance with the invention there is provided a single winder for a plurality of belts wherein the winder is wound in the same direction by the belts or cables which enter the winder at opposed points, all as more particularly seen in the drawings and as descirbed below. Through the use of belts or cables as energy-absorbing stays, for the front seat back rest, the amount of space required for the stays is reduced. Additionally, the danger of injury to rear seat occupants is still further diminished. If the belt winder is disposed on the front seat back rest or, according to a preferred embodiment of the invention, on a restraining cushion disposed on the back of such back rest, the already small space available in the rear portion of the vehicle is not additionally reduced.

In accordance with the invention there are provided additional embodiments. The winders for the two belts or cables of a front seat back rest can be mechanically coupled to one another or the winders of the two belts or cables can be positioned in a single drum on which the two belts or cables of a front back rest are wound, i.e., they can be co-wound about the same winder in which event when a collision occurs the same amount of each belt will be taken-up during the winding operation.

Mechanically coupled winders or the drum, as the case may be, are best located in the center of the front seat back rest. To prevent the canting of the front seat back rest in the case of the eccentric application of force, the belts or cables of the front seat back rest are, in accordance with another embodiment of the invention, wound on the winder in the same direction. This means that rotation of the drum in a clockwise direction, for example will wind up or shorten both belts equally. Thus the seat back rest cannot cant or twist and thus cannot pin the occupants in the event of am collision.

The achievement of the objective in accordance with this invention is aided by an additional feature according to which the winders or drum, as the case may be, can be locked up by a detent device and/or gripping device. Preferably the detent device or gripping device is one which would yield if the force applied to it exceeds a certain level. This detent or gripping device can be combined with the seat and back rest adjustment actuating lever. It can be released manually or, for example, electromechanically for the adjustment of the seat.

In order to achieve at all times the same desirable action in the event of a readjustment of the front seat, the winders or drums are provided with a tension means which maintains the belts or cable in the same tense state, by spring power, for example.

Especially when the belt winders or drums are located in the center of the back rest, it is desirable to provide pulleys on the lateral surfaces of the seat back rest, in accordance with another feature of the invention, in order to turn the belts about an angle of 90° rearwardly. These vehicles can at the same time be so disposed that they will serve for the guidance of the front seat back rest in the longitudinal direction.

One of the belts of a front seat back rest can, in accordance with another embodiment of the invention, be anchored with its free end to the lateral surface of the car body, preferably to the region of the door lock of the rear doors such as on a door lock member. The end of the other can be anchored to the body in the middle of the vehicle. This can be shown in the drawings as more fully described below. The anchoring in the vicinity of the door lock is advantageous in that stresses are transmitted to the door frame. The anchoring in the middle of the vehicle can be such as to be releasable by means of a belt lock. Corresponding belts of the two front seat back rests can be releasably fastened to the vehicle body by a common belt lock. The releasable fastening of the belts in the middle of the vehicle is advantageous in that the occupants of the rear seat can thus slide through when entering or leaving the vehicle. It also enables maximum utilization of the rearward interior space of the vehicle whereby to permit the rear seat to be occupied by a third person thus providing overall capacity of the vehicle for at least five persons.

To allow the rear seat occupants more free space and thus, if desired, to create a fifth seating place, it is preferred that one end of an inwardly disposed belt or cable be anchored to the roof at the center of the vehicle together with the corresponding belt of the other front seat back rest, if desired.

Thus, in accordance with the invention, if bucket seats or other individual seats are employed as front seats each of said seat is provided with its own anchoring stay assembly comprising the two belts and the winder or drum. The belts which would be disposed toward the center of the vehicle can have a common mechanism for releasably fastening them to the vehicle body.

Good restraint for the rear seat occupants without using belts is possible only by means of an additional straining cushion fastened to the seat back rest. However, to maintain the distance between the restraining cushion and the passenger's body as small as possible, it is necessary to gain more room upon entering and leaving the seat. Thus, the back rest having the restraining cushion is simply pushed forward, the detent and/or gripping device of the drum is disengaged preferably when the doors are open. At this time, there will occur a compensation in the difference in length in the belt from the front seat back rest to the door lock which compensation is produced upon the opening and closing of the rear doors. The adjustment of the back rest inclination can be accomplished in a known manner by the joint and an adjustable stop acting rearwardly.

BRIEF DESCRIPTION OF DRAWINGS

In order to more fully illustrate the nature of the invention reference is made to the accompanying drawings in which.

DESCRIPTION OF SPECIFIC EMBODIMENTS

Figure 1:
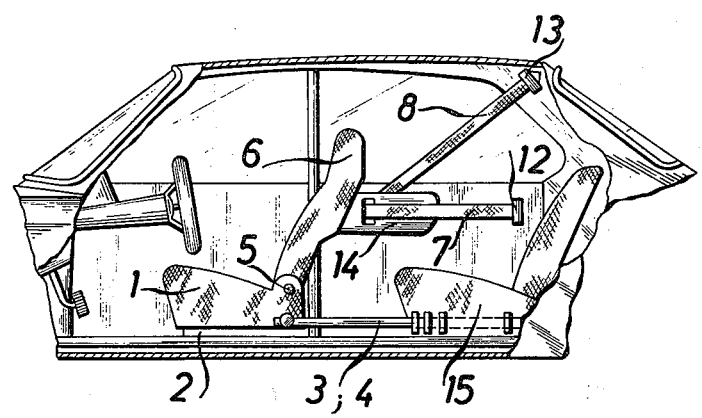
FIG. 1 is a side elevational view, partly cut away, showing a portion of an automobile equipped with the safety system of the invention.
Figure 2:
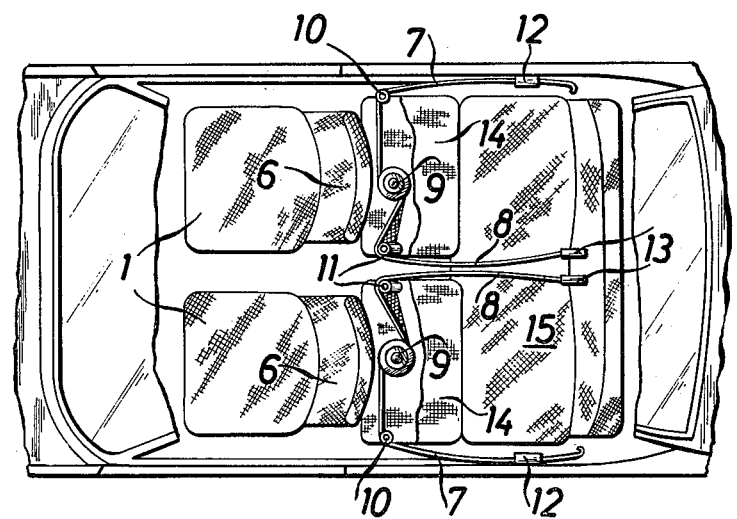
FIG. 2 is a top plan view of the passenger compartment of an automobile of FIG. 1.

Referring to the drawings herein in FIGS. 1 and 2 there is shown an automobile equipped with a preferred embodiment of the invention wherein there are front seats 1 having a back rest 6. The front seat is displaceably disposed in a seat guide 2 which acts as a damping means and restraining the movement of the seat in a lengthwise direction of the vehicle through the use of the energy absorbing dampers 3 and 4. The front seat back rest 6 is fastened to seat 1 at a joint 5.

Each front seat back rest 6 is stayed to the car body in an energy absorbing manner, in accordance with the invention, by utilization of a pair of belts 7 and 8. The two belts 7 and 8 are wound on a drum or winder 9 which is disposed approximately in the center of the front seat back rest 6. In accordance with the embodiment shown in FIG. 2 the winder 9 is disposed on a restraining cushion 14 which in turn is fastened to the front seat back rest 6.

Figure 3:
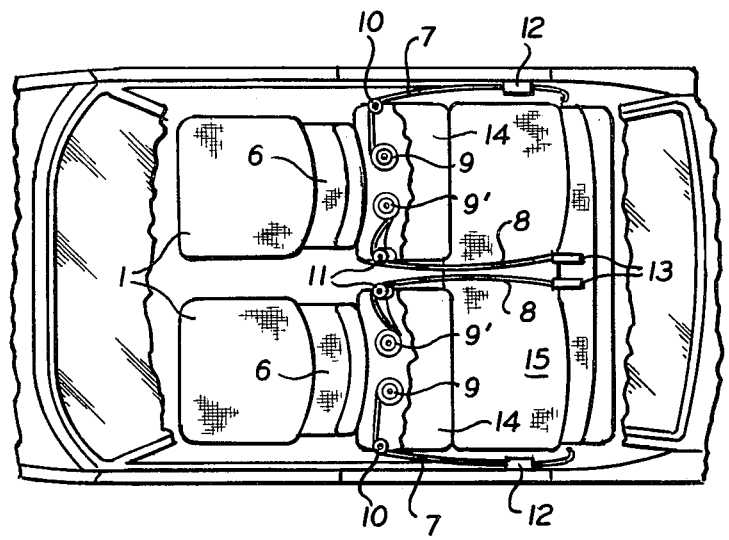
FIG. 3 is a top plan view of the passenger compartment of an automobile equipped with a plurality of winders on the back of the front seat back rest, one of these winders being for a first belt and another of the winders being for a second belt.

In accordance with the embodiment shown in FIG. 3, a plurality of winders 9 and 9' are disposed on the restraining cushion 14 which, in turn, is fastened to the front seat back rest 6. The respective belts 12 and 13 are connected to the separate winders in the same manner as belts 12 and 13 were connected to the same winder according to the embodiment shown in FIG. 2.

Belts 7 and 8 are attached to and wound about the drum 9 and run toward the lateral edges of the front seat back rest. Here their direction turns rearwardly through utilization of pulleys 10 and 11 which are fastened to the restraining cushion 14. If no restraining cushion 14 were present the pulleys 10 and 11 would be connected at the lateral edges of the front seat back rest itself. The belts travel rearwardly and are anchored in the rear area of the vehicle to the lateral surface of the body in the area 12 of the door lock of the rear door. Preferably, they are anchored at the roof 13.

On the drum 9, there is provided a detent or gripping device (not shown) and a tension means, also not shown, which act when the seat and/or back rest are adjusted. The two belts 7 and 8 are wound on the drum 9 in the same direction, i.e., when the belt 7 is pulled out, the other belt of the front back rest 6 acquires the same length. This insures that the front seat back rest cannot rack or twist and that the same restraining forces act at all points such as in the center or at one side of the back rest 6 or on the restraining cushion 14, as the case may be. The vehicle is equipped with a back seat bench 15 as shown.

The invention is not limited to the above-described embodiment. Constructional modifications are, of course, possible within the scope of the idea of the invention described in the beginning. For example, instead of the drum 9, two belt winders can be provided, which are either independent of one another or mechanically coupled to one another, e.g., at the lateral edges of the front seat back rest and/or in the center of the back rest.

In addition, other possibilities of embodiment exist. Thus, the belts or the like for the restraint of the back rest can be so constructed that they can be pulled out or elongated only to a certain length, so as not to pin the front seat occupant in the event of a severe collision. It is also possible to fasten the body belts, especially the shoulder belt, of the front seat passenger, to the back rest restraining belts, preferably with stress limitation. Furthermore, it is also possible to obtain the fifth seating place by modifying the belt layout and the anchoring points.

There are several further embodiments of the invention. Thus the belts which run rearwardly from the back rest and are anchored to the car body need not run in the center of the width of the vehicle but can run such that two seating places will be available one on one side and one seating place on the other side of the back seat bench. Alternatively, the belts can extend virtually in the center of the vehicle from the back rests towards the rear axle, such that the center seating area of the back seat bench remains free. In such instance the belts run between the legs of the middle seat passenger at an angle to such passenger.

Lastly, the belts 7 and 8 can consist of a single belt which is wound on the drum 9 and is held thereto by its own coil or by an extra fastening means.

By the above construction several important advantages are achieved which can be outlined as follows:

1. The rear seat occupant cannot become pinned between the front seat back rests or between the front seat back rest and the door side of the vehicle in the event of a collision.
2. Virtually no space is lost, and yet the front seat back rest is restrained on both sides in an energy-dissipating manner, also for the protection of the front seat occupant.
3. The fifth seating place is not lost.
4. Compensation of twisting or canting of the front seat back rest for the rear seat passengers in a collision, with constant restraining force at each point on the front seat back rest.
5. Secure anchoring of the belt to the door lock portions of the rear doors for the restraint of the back rests on the door sides.
6. The belt for the front seat occupants can be fastened, preferably with stress limitation, to the belts which restrain the front seat back rests.
7. Simple adjustment of seats and back rests.
8. The vehicle can be occupied in any desired manner, and nevertheless a constant restraining force can be available for every occupant.
9. Easy boarding for the rear seat occupants by pushing front seat back rest forward together with restraining cushion, when the rear doors are opened.

What is claimed is:

1. In a safety system for the occupants of a vehicle having a front seat, said front seat having a back rest, the improvement which comprises an energy-absorbing holding means for said back rest comprising a first belt or cable attached at one end to a rearward portion of the body of said vehicle and at the other end being wound about and attached to a winder disposed on the rear side of the back rest of the front seat and a second belt or cable attached to said vehicle body rearwardly of said winder and wound about and connected to said winder.

2. A safety system according to claim 1 wherein said first and second belts enter said winder at opposed points and are attached to different points of said vehicle body.

3. A safety system according to claim 2 wherein said winder is disposed in a restraining cushion fastened to the rear side of the back rest of the front seat.

4. A safety system according to claim 1 wherein said first and second belts or cables are wound in the same direction.

5. A safety system according to claim 1 wherein at least one of said winders is provided with a detent and/or gripping means for force-limited stopping.

6. A safety system according to claim 1 wherein each belt or cable passes over a pulley disposed between the winder and the vehicle body.

7. A safety system according to claim 6 wherein the pulley is positioned at a lateral edge of the front seat back rest.

8. A safety system according to claim 1 wherein the bench of said front seats are attached to an energy-absorbing damping system which restrains lengthwise movement of said seats said energy-absorbing damping system being disposed along the floor of the vehicle body at at least one side thereof.

9. A safety system according to claim 1 wherein there are a plurality of front seats in said vehicle each of which has attached to its back rest a first belt or cable, a second belt or cable and a winder, said first belt or cable being connected rearwardly of said winder to the vehicle body and being wound about and connected to said winder, said second belt or cable being disposed rearwardly of said winder and being wound about and connected to said winder.

10. A safety system according to claim 6 wherein said pulley is at the lateral edge of said restraining cushion.

11. A safety system according to claim 1 wherein one of said belts or cables of the front seat back rest is anchored at the lateral surface of the vehicle body and the other of said belt or cable is anchored virtually in the center of the vehicle to the body thereof.

12. A safety system according to claim 11 wherein a first belt is anchored to a door lock member and the second belt is anchored virtually in the center of the vehicle to the body thereof.

13. A safety system according to claim 11 wherein the belt anchored to the center of the vehicle is fastened releasably to the body in the center of the vehicle by means of a belt lock.

14. A safety system according to claim 13 wherein said belt or cable anchored in the center of the vehicle body is anchored to the vehicle roof.

15. A safety system according to claim 5 wherein said detent and/or gripping means is provided with means for locking the same in at least one direction of rotation upon the closing of the doors.

16. In a safety system for the occupants of a vehicle having a front seat, said front seat having a back rest, the improvement which comprises an energy-absorbing holding means for said back rest comprising a first belt or cable attached at one end to a rearward portion of the body of said vehicle and at the other end being wound about and attached to a first winder disposed on the rear side of the back rest of the front seat and a second belt or cable attached to said vehicle body rearwardly of a second winder and wound about and connected to said second winder, said second winder being disposed on the rear side of the back rest of the front seat.

* * * * *